United States Patent
Sabolcik

(10) Patent No.: US 12,324,077 B1
(45) Date of Patent: Jun. 3, 2025

(54) CIRCUIT MAPPING

(71) Applicant: Wangs Alliance Corporation, Port Washington, NY (US)

(72) Inventor: Michael Sabolcik, Leander, TX (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 19/010,706

(22) Filed: Jan. 6, 2025

Related U.S. Application Data

(60) Provisional application No. 63/707,824, filed on Oct. 16, 2024.

(51) Int. Cl.

| | |
|---|---|
| *H05B 47/175* | (2020.01) |
| *H04W 48/08* | (2009.01) |
| *H04W 60/00* | (2009.01) |
| *H05B 47/185* | (2020.01) |
| *H05B 47/19* | (2020.01) |

(52) U.S. Cl.
CPC .......... *H05B 47/199* (2024.01); *H04W 48/08* (2013.01); *H04W 60/00* (2013.01); *H05B 47/185* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 10,201,063 B2* | 2/2019 | Leinen | H05B 47/198 |
| 10,251,246 B2* | 4/2019 | Shukla | H05B 47/19 |
| 11,003,548 B2* | 5/2021 | Raghuram | G06F 11/1461 |
| 12,075,545 B1 | 8/2024 | Sabolcik et al. | |
| 2012/0140748 A1* | 6/2012 | Carruthers | H04W 4/21 370/338 |
| 2017/0086281 A1 | 3/2017 | Avrahamy | |
| 2019/0313503 A1 | 10/2019 | Woytowitz | |
| 2019/0373687 A1 | 12/2019 | Williams et al. | |
| 2021/0314867 A1 | 10/2021 | Abou-Rizk et al. | |
| 2021/0345085 A1* | 11/2021 | Anselm | H04W 8/005 |

* cited by examiner

*Primary Examiner* — Hong S Cho
(74) *Attorney, Agent, or Firm* — Weiss & Arons LLP

(57) ABSTRACT

A method for provisioning IoT fixtures. The method may include inputting to a microprocessor a circuit identifier associated with a circuit that includes a first fixture that is within a reception range of a radio frequency fixture interface. A second fixture may be deployed within the range. The method may include initiating a fixture discovery process, over a wired path, from a wall station that is in wired communication with the first fixture and not in wired communication with the second fixture. The method may include receiving, at a wireless communication device, a wireless discovery message from the first fixture and not from the second fixture. The method may also include, in response to receipt of the wireless discovery message, confirming an association between the first fixture with the circuit identifier.

28 Claims, 18 Drawing Sheets

1600

1601
App may display list of pending fixtures. When all shown, click "NEXT"

1603
Gateway provisions devices to mesh

1605
The nodes are now configured to be contacted wirelessly via the wallstation 1607
The gateway may be powered off

FIG. 16

CIRCUIT MAPPING

CROSS-REFERENCE TO RELATED APPLICATIONS

This is a nonprovisional of U.S. Provisional Application No. 63/707,824, filed on Oct. 16, 2024, which is hereby incorporated herein by reference in its entirety.

BACKGROUND

A typical IoT fixture is operable via wireless communication with a controlling device with which the fixture is registered. When the IoT fixture is deployed as one of numerous IoT fixtures in an architectural setting, each of the fixtures may need to be registered separately, which may require a registration step for each of the fixtures. If some of the IoT fixtures are to be controlled wirelessly from different wall stations, it may be unclear to a user or installer which of the fixtures correspond to which of the wall stations.

It would be desirable therefore to provide apparatus and methods for registering groups of fixtures to a wireless controlling device or a wall station.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 16 shows illustrative steps of a process in accordance with the principles of the invention.

DETAILED DESCRIPTION

Figure 1:
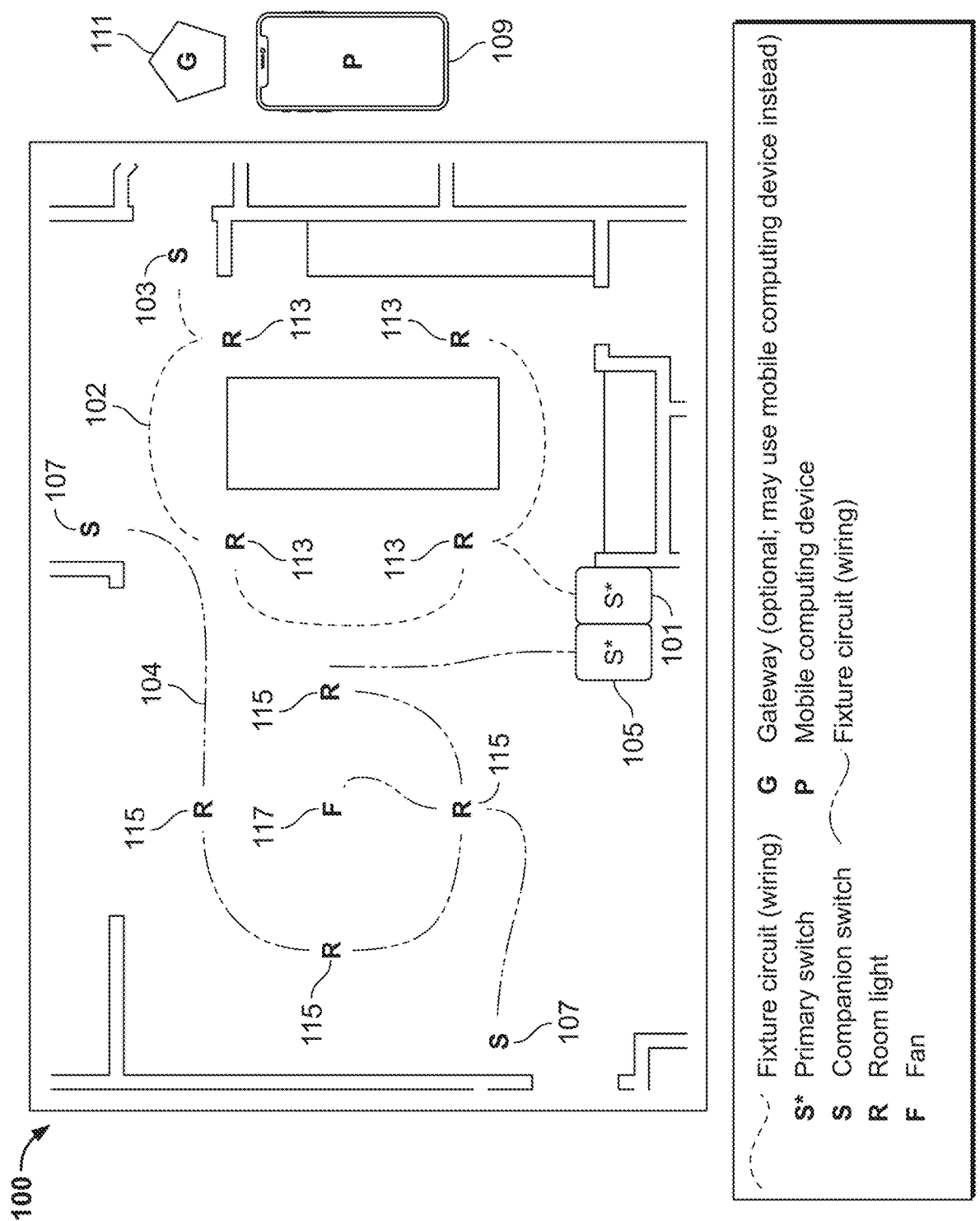
FIG. 1 shows schematically illustrative apparatus in accordance with the principles of the invention.

Apparatus and methods for using wired circuits to configure nodes wired thereto for participation in a wireless network discovery process are provided.

The methods may include methods for provisioning IoT devices. The methods may include methods for provisioning nodes. One or more of the nodes may include an IoT device. The nodes may include one or more fixtures. A fixture may include a lighting device. A fixture may include a fan. The nodes may include a wall station. The nodes may include a companion switch. A companion switch may have one or more features shown and discussed in connection with a wall station. A companion switch may include a fixture.

A fixture may include a controller. A fixture may include a microcontroller. A fixture may include LEDs. The microcontroller may control the LEDs. A fixture may include a motor. A fixture may support wireless communication. The wireless communication may have transmitting and/or receiving capabilities. A fixture may draw power from a building power line via the wall station.

The methods may include inputting to a microprocessor a circuit identifier. The microprocessor may be included in a mobile or wireless computing device. The microprocessor may be included in a phone. The circuit identifier may be input into an application ("app") running on the microprocessor.

The microprocessor may be included in a gateway. The gateway may be installed in a home, within a wireless communication range from the first fixture. The gateway may include a mobile or wireless computing device that is not fixed in place.

The microprocessor may be included in the wall station.

The circuit identifier may be associated with a circuit. The circuit may include a first fixture. The first fixture may be within a reception range of a radio frequency fixture interface. A second fixture may be deployed within the reception range.

The circuit identifier may be associated with a room. The room may be a room in which the nodes are installed. The circuit identifier may be associated with a group. The group may be one or more nodes connected to the circuit and selected by a user. Each of the nodes may receive power from the circuit.

The radio frequency fixture interface may be included in the wall station. The radio frequency fixture interface may be included in the gateway. The radio frequency interface may be included in the microprocessor.

The methods may include initiating a fixture discovery process. The fixture discovery process may be initiated over a wired path from the wall station. The wired path may include the circuit.

The wall station may be in wired communication with the first fixture. The circuit may establish the wired communication. The wall station may be a wall station that is not in wired communication with the second fixture. The wall station may be a wall station that is not in wired communication with the second fixture for propagation of a voltage sequence.

The wall station may provide power from an electrical panel to the first fixture. The second fixture may be wired to receive power from the electrical panel. The wall station may be a first wall station and the circuit may be a first circuit. A second wall station may be wired to the electrical panel. The second wall station may provide power from the electrical panel to a second circuit. The second fixture may receive power from the second circuit.

The first fixture and the second fixture may be in a room. The first fixture may be in a first room. The second fixture may be in a second room.

The methods may include receiving, at a wireless communication device, a wireless discovery message from the first fixture. The methods may include receiving, at a wireless communication device, a wireless discovery message from the first fixture and not from the second fixture.

The wireless communication device may include the microprocessor. The wireless communication device may include the gateway. The wireless communication device may include the wall station.

The wireless discovery message may include first fixture identification information. First fixture identification information may include a unique identifier such as a MAC address, an IP address, or any other suitable information. The unique identifier may be a unique network identifier. The wireless discovery message may include an indication that the first fixture is present in the circuit. The wireless discovery message may include an indication that the first fixture is discoverable.

The methods may include, in response to receipt of the wireless discovery message, associating the first fixture with the circuit identifier.

The microprocessor may associate the first fixture with the circuit identifier. The associating may include storing, in a data structure, the circuit identifier together with the first fixture identification information. The associating may be performed in response to a user confirming an association between the first fixture and the circuit identifier. The confirmation may be received in the application. The confirmation may be a selection executed by the user in the application.

The initiating of the fixture discovery process may include outputting, from the wall station, over the wired path, a series of voltage pulses. A voltage pulse may include an ON/OFF cycle of power (e.g., 110-120 or 220-240 V/C) derived from the electrical panel. The initiating may include providing, to the wall station, from the wireless communication device, an instruction to output the pulses. The pulses may be configured to increment a counter in the first fixture and cause the first fixture to transmit the discovery message when the counter reaches a pre-set value. A pulse may include a length of time during which current is being provided by the wall station. The pulses may be separated by a duration of time when the voltage is zero or nearly zero.

The wall station may include a switch. The switch may include a button. The initiating of the fixture discovery process may include operating the switch at the wall station to cause the wall station to output the pulses. The switch may include a mechanical switch, an option displayed on a touchscreen or a capacitive switch. The switch may be one of a plurality of switches. The plurality of switches may be co-operable such that actuation of two or more of the switches causes the wall station to output the pulses. The plurality of switches may be co-operable to cause the wall station to output the pulses such that pressing two or more switches on the wall station triggers the outputting of the pulses.

The methods may include receiving, in the application, one or more lighting scenes for associating with the circuit identifier. Each lighting scene may be associated with a switch included in the wall station. The methods may include storing, in a data structure, the circuit identifier, each lighting scene received for the circuit identifier, and the switch associated with each lighting scene.

The methods may include transmitting, from the wireless communication device, a first lighting scene and a second lighting scene to the wall station. The first lighting scene may be associated with a first switch of the wall station. The second lighting scene may be associated with a second switch of the wall station. A lighting scene may be associated with a selection relating to one or more of a light level, including diming level and intensity, for one or more of red, green, blue, warm white, cool white and any other suitable color. A lighting scene may include a predetermined brightness, color and/or correlated color temperature ("CCT").

During the fixture discovery process, the first fixture may continuously transmit the wireless discovery message. The first fixture may transmit the wireless discovery message via a Bluetooth mesh. The first fixture may transmit the wireless discovery message using radio frequency ("RF") communication.

During the fixture discovery process, the first fixture may repeatedly transmit the wireless discovery message.

The methods may include receiving, at the wireless communication device, a second wireless discovery message from the first fixture. The second wireless discovery message may correspond to a third fixture included in the circuit. The third fixture may be a third fixture that is not in the reception range. The third fixture may be in the reception range.

The methods may include, when the discovery message is a first discovery message, receiving, at the wireless communication device, a second wireless discovery message from the wall station. When the wall station is instructed to output the pulses, the wall station may both output the pulses and transmit the second wireless discovery message. The wall station may transmit the wireless discovery message using RF communication. The wall station may transmit the wireless discovery message via a Bluetooth mesh.

During the fixture discovery process, the wall station may continuously transmit the wireless discovery message. During the fixture discovery process, the wall station may repeatedly transmit the wireless discovery message. The second wireless discovery message may include wall station identification information. Wall station identification information may include a unique identifier of the wall station such as a MAC address, an IP address, or any other suitable information. The wireless discovery message may include an indication that the wall station is present in the circuit. The wireless discovery message may include an indication that the wall station is discoverable.

The methods may include associating the wall station with the circuit identifier. The associating may include storing, in a data structure, wall station identification information together with the circuit identifier. The methods may include associating the wall station and the first fixture with the circuit identifier. The associating may include storing, in a data structure, wall station identification information and first fixture identification information together with the circuit identifier. The associating may be performed in response to a user confirming an associating between the wall station and the circuit identifier.

The methods may include transmitting to the wall station, from the wireless communication device, first fixture identification information included in the wireless discovery message. The methods may include transmitting to the wall station lighting scenes and, for each lighting scene, an associated switch.

The methods may include, after receipt, by the wall station, of the first fixture identification information, transmitting a lighting instruction to the first fixture using wireless signals only. The lighting instruction may be transmitted from the wall station to the first fixture. The lighting instruction may be transmitted in response to a user selection of a switch included in the wall station. The lighting instruction may be transmitted in response to receipt, by the wall station, of a wireless instruction from the gateway. The lighting instruction may include first fixture identification information.

The lighting instruction may be an ON/OFF instruction. When the instruction is an ON instruction, the lighting instruction may correspond to the lighting scene associated with the selected switch.

The methods may include transmitting from the wireless communication device to the wall station an instruction to implement the first lighting scene on the first circuit.

The first wall station may include a switch. The switch may be a primary switch. The methods may include receiving, at the wireless communication device, a third wireless discovery message from a companion switch associated with the circuit. The companion switch may include a switch. The companion switch may draw power from the circuit. The companion switch may be a companion switch that does not draw power from the electrical panel. The companion switch may be configured to output the third wireless discovery message in response to receipt of the pulses, as described herein in connection with the first fixture.

The third wireless discovery message may include companion switch identification information. The companion switch identification information may include a unique identifier of the companion switch such as a MAC address, an IP address, or any other suitable information. The wireless discovery message may include an indication that the companion switch is present in the circuit. The wireless discovery message may include an indication that the companion switch is discoverable.

The methods may include associating the wall station and the companion switch with the circuit identifier. The methods may include transmitting, from the wireless communication device to the wall station, first fixture identification information included in the wireless discovery message. The methods may include transmitting, from the wireless communication device to the companion switch, first fixture identification information included in the wireless discovery message.

The methods may include associating the wall station, the companion switch and the first fixture with the circuit identifier.

The first fixture may be one of a plurality of first fixtures associated with the circuit. Each of the plurality of first fixtures may have one or more features shown and discussed in connection with the first fixture.

Each of the plurality of first fixtures may be in wired communication with the wall station. When the fixture discovery process is initiated, each of the plurality of first fixtures may transmit a wireless discovery message. The methods may include receiving at the wireless communication device a plurality of wireless discovery messages. Each of the plurality of wireless discovery messages may correspond to one of the plurality of first fixtures. The wireless discovery message may include a unique identifier of the fixture such as a MAC address, an IP address, or any other suitable information. The wireless discovery message may include an indication that the fixture is present in the circuit.

The wireless discovery message may include an indication that the fixture is discoverable.

The methods may include, in response to receipt of the wireless discovery messages, associating the plurality of first fixtures with the circuit identifier. The methods may include associating the plurality of first fixtures, and not the second fixture, with the circuit identifier.

The methods may include transmitting to the wall station, from the wireless communication device, unique fixture identification information for each of the plurality of first fixtures. The methods may also include transmitting to the wall station companion switch identification information, and one or more lighting scenes and identifiers of their associated switches. The methods may include, after receipt, by the wall station, of the fixture identification information, transmitting a lighting instruction to the plurality of first fixtures using wireless signals only.

The wall station may include the switch. The wall station may be configured to, prior to the initiating of the fixture discovery process, provide a default amount of power to the first fixture, over the circuit, when a user operates the switch. The switch may be in electrical communication with a microprocessor in the wall station.

The wall station may transmit current to all fixtures that are downstream from the wall station. Prior to the initiating of the fixture discovery process, the wall station may be configured to provide a default amount of power to the first fixture, over the circuit. When the switch is a mechanical switch, the wall station may provide the default amount of power when a user manipulates the switch. When the switch is a touch screen switch, the wall station may provide the default amount of power when a user selects a switch displayed on the touch screen surface. When the switch is a capacitive switch, the wall station may provide the default amount of power when a user selects the capacitive surface.

The wall station may use an internal relay to control power to downstream fixtures. Downstream fixtures may be fixtures that are wired to the wall station. The wall station may transmit the full voltage received from the electrical panel to the downstream fixtures. The full voltage may be 110-120/220-240 VAC. The first fixture, prior to the fixture discovery process, may output a maximum intensity light at a value set in firmware of the first fixture. The fixture may be programmed to output a default light intensity and a default light color. The default light intensity may be an intensity in the range from 0-100% of a nominal maximum intensity for the fixture or for an LED or a string of LEDs included in the fixture. An illustrative default light intensity may be 100% of a nominal maximum intensity. The default light color may be red, green, blue, warm white, cool white, or any other suitable combination thereof. An illustrative default light color may be 3000K.

The methods may include initiating a second fixture discovery process over a wired path from a second wall station. The second wall station may be in wired communication with the second fixture. The second wall station may be a second wall station that is not in wired communication with the first fixture.

The methods may include receiving, at the wireless communication device, a second wireless discovery message from the second fixture. The methods may include receiving, at the wireless communication device, a second wireless discovery message from the second fixture and not from the first fixture.

The methods may include, in response to receipt of the second wireless discovery message, associating the second fixture with a second circuit identifier. The methods may include, in response to receipt of the second wireless discovery message, associating the second fixture, and not the first fixture, with second circuit identifier. The methods may include receiving, for the second circuit identifier, one or more lighting scenes and identifiers of their associated switches.

The wireless communication device may be configured to, prior to the initiating of the second fixture discovery process, determine whether the first fixture discovery process is running. The wireless communication device may be configured to, in response to a determination that the first fixture discovery process is running, decline to initiate the second fixture discovery process.

The steps of illustrative methods may be performed in an order other than the order shown or described herein. Some embodiments may omit steps shown or described in connection with the illustrative methods. Some embodiments may include steps that are neither shown nor described in connection with the illustrative methods. Illustrative method steps may be combined. For example, one illustrative method may include steps shown in connection with another illustrative method.

Some embodiments may omit features shown or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus or some or all of the steps of the illustrative methods.

Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional and procedural modifications or omissions may be made without departing from the scope and spirit of the present invention.

The illustrative apparatus and methods will now be described with reference to the accompanying Figures, which form a part hereof. It is to be understood that other embodiments may be utilized and that structural, functional and procedural modifications may be made without departing from the scope and spirit of the present disclosure.

FIG. 1 shows illustrative architectural layout 100 with circuit 102 and circuit 104 that may be used in accordance with the invention. Architectural layout 100 may include wall station 101. Wall station 101 may include a primary switch. Wall station 101 may draw power from an electrical panel (not shown). Wall station 101 may provide power, over circuit 102, to room lights 113.

Circuit 102 may extend from wall station 101 to room lights 113 and companion switch 103. Room lights 113 and companion switch 103 may be downstream, on circuit 102, from wall station 101.

Architectural layout 100 may include wall station 105. Wall station 105 may include a primary switch. Wall station 105 may draw power from the electrical panel. Wall station 105 may provide power, over a second circuit, to one or more of room lights 113 and fan 117.

Circuit 104 may extend from wall station 105 to room lights 115, fan 117 and companion switches 107. Room lights 115, fan 117 and companion switches 107 may be downstream, on circuit 104, from wall station 105.

Architectural layout 100 may include mobile device 109. Mobile device 109 may include the microprocessor. Mobile device 109 may be used in or near the rooms represented in architectural layout 100. Mobile device 109 may be used remotely via a cloud connection to gateway 111 or wall station 101 and wall station 103. The cloud may include one or more servers that may store data and may be in communication with one or more of mobile device 109, gateway 111 and wall stations 101 and 103.

Architectural layout 100 may include gateway 111. Gateway 111 may be used in or near the rooms represented in architectural layout 100. Gateway 111 may include the microprocessor. Gateway 111 may be a gateway that does not include the microprocessor.

Figure 2:
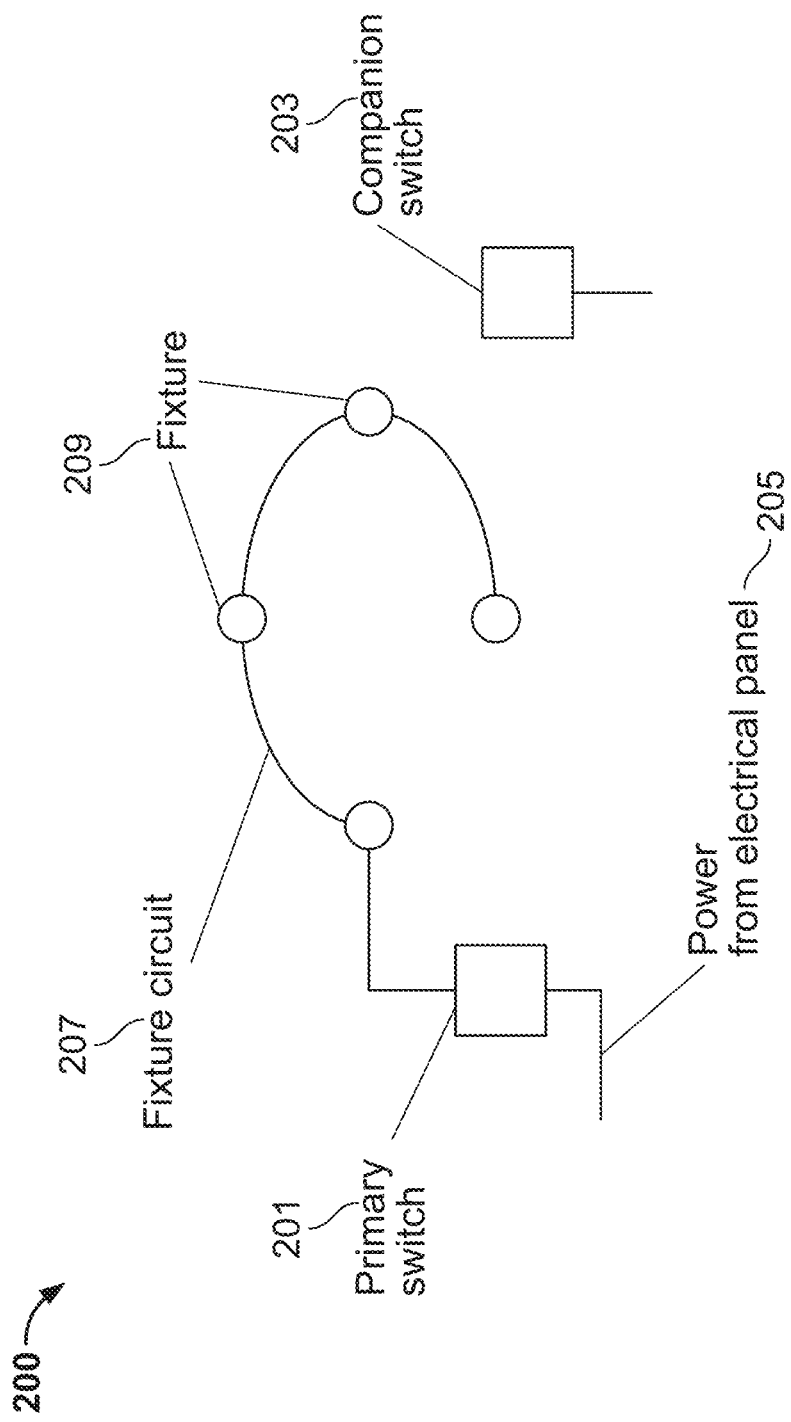
FIG. 2 shows schematically illustrative apparatus in accordance with the principles of the invention.

FIG. 2 shows illustrative layout 200. In illustrative layout 200, power from electrical panel 205 may be provided to primary switch 201. Primary switch 201 may include a wall station (not shown). Primary switch 201 may provide power to fixture circuit 207. Fixture circuit 207 may include fixtures 209. Companion switch may be coupled to fixture circuit 207. Architectural layout 100 may have one or more features shown and discussed in connection with layout 200.

Figure 3:
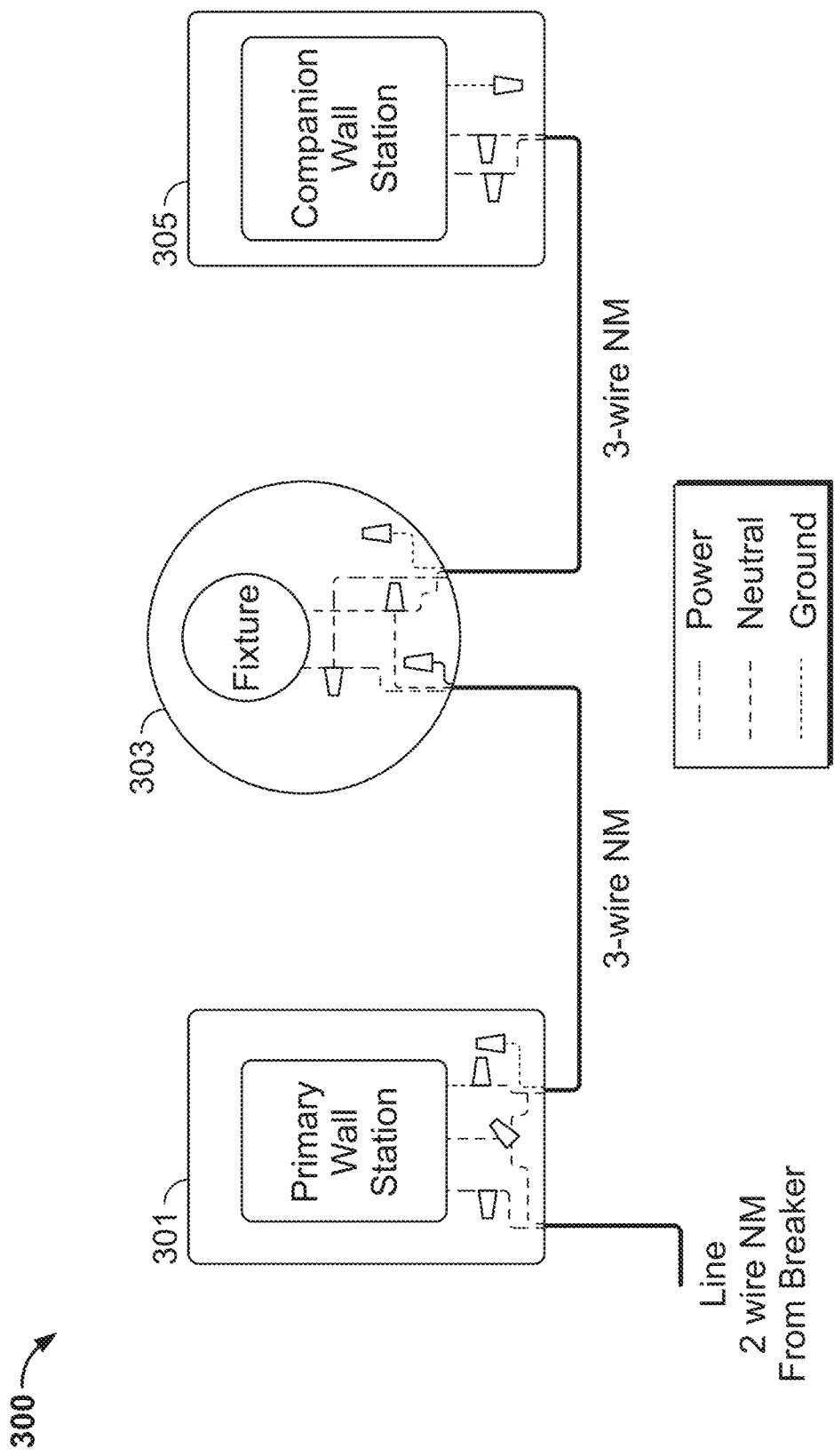
FIG. 3 shows schematically illustrative apparatus in accordance with the principles of the invention.

FIG. 3 shows wiring configuration 300. Wiring configuration 300 may provide power conduction paths from primary wall station 301 to other nodes (e.g., one or more fixtures 303 or companion switches 305) on the circuit. The paths may be configured to allow a power sequence to propagate from the wall station to the nodes. The power sequence may include the pulses.

In circuits where there are multiple wall stations, the circuit may be re-wired (using existing conductors in-wall) to facilitate the primary wall station controlling power to all fixtures and other wall stations (companions) in the circuit. Companion switches in the circuit may be switches that cannot deliver 110-120/210-220 VAC power to the circuit. Power from the primary wall station may power the companion switches.

Room lights 113, wall station 101 and companion switch 103 may be wired as illustrated in FIG. 3. Room lights 115, fan 117, wall station 105 and companion switches 107 may be wired as illustrated in FIG. 3.

Figure 4:
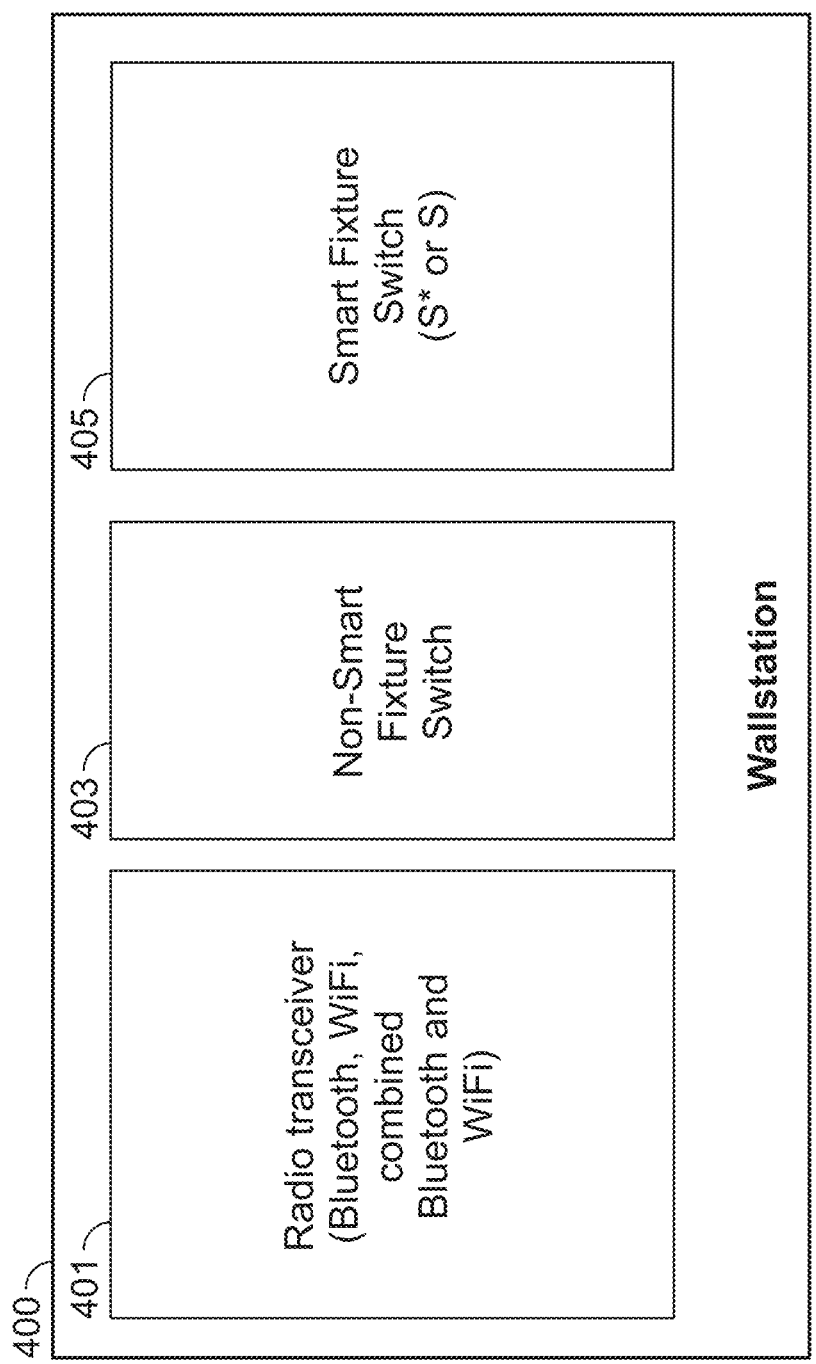
FIG. 4 shows schematically illustrative apparatus in accordance with the principles of the invention.

FIG. 4 shows schematically wall station 400 in accordance with the principles of the invention. Wall station 400 may include radio transceiver 401. Radio transceiver may support one or more of Bluetooth and WiFi communications. Wall station 400 may include non-smart fixture switch 403. Non-smart fixture switch 403 may include a mechanical switch. Wall station 400 may include smart fixture switch 405. Smart fixture switch 405 may be provisioned, using methods described herein, to communicate wirelessly with fixtures powered by wall station 400. The wireless communication may include an ON/OFF command. The wireless communication may include a lighting scene.

One or more of wall station 101, companion switch 103, wall station 105 and companion switches 107 may have one or more features shown and discussed in connection with wall station 400.

Figure 5:
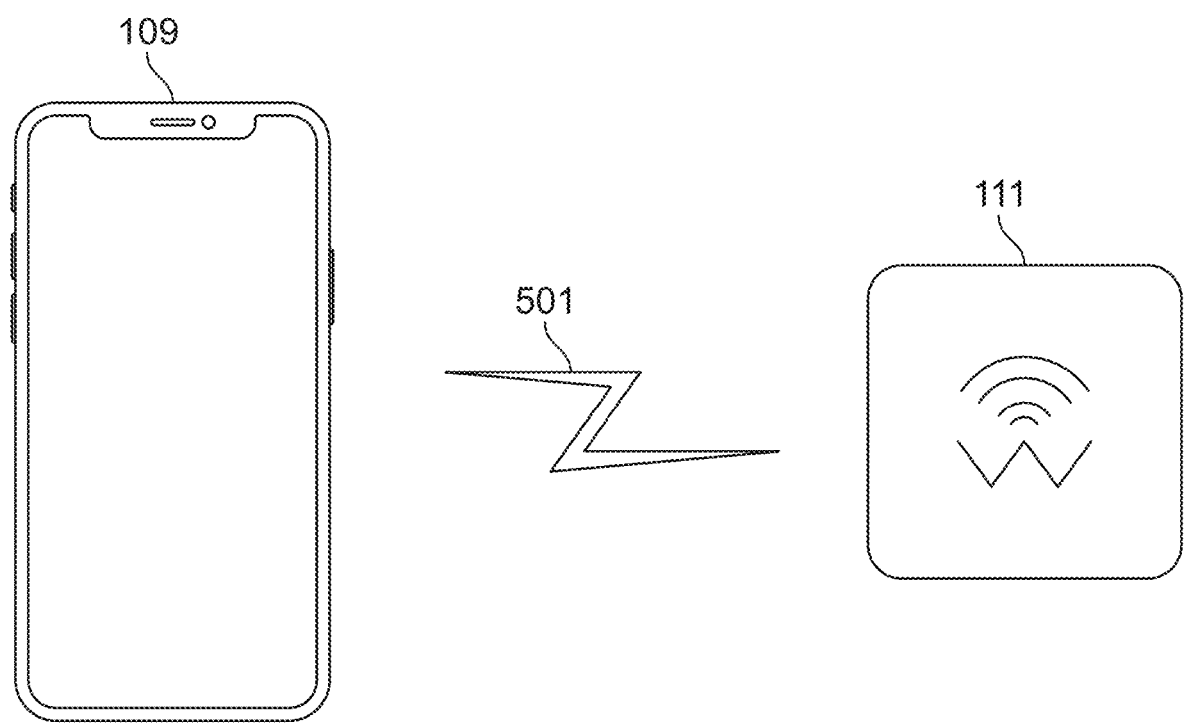
FIG. 5 shows schematically illustrative apparatus in accordance with the principles of the invention.

FIG. 5 shows schematically illustrative apparatus in accordance with the principles of the invention. In FIG. 5, mobile device 109 may be in electronic communication with gateway 111 using wireless communication signal 501. Wireless communication signal 501 may be a Wifi signal. Mobile device 109 may communicate with gateway 111 over the Internet using a Wifi signal.

Figure 6:
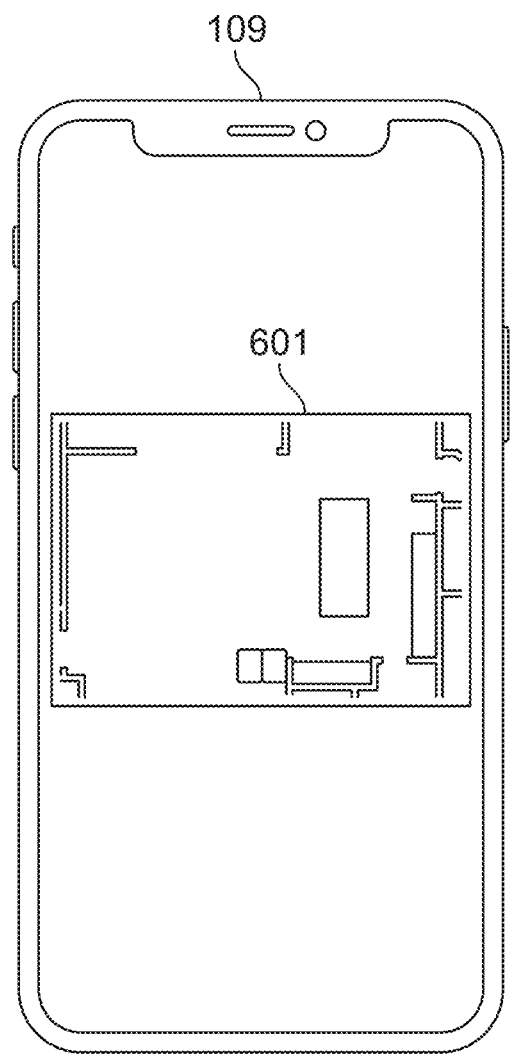
FIG. 6 shows schematically illustrative apparatus in accordance with the principles of the invention.

FIG. 6 shows schematically illustrative apparatus in accordance with the principles of the invention. In FIG. 6, mobile device 109 may be running the application. The application may display, to a user, architectural layout of room 601.

Figure 7:
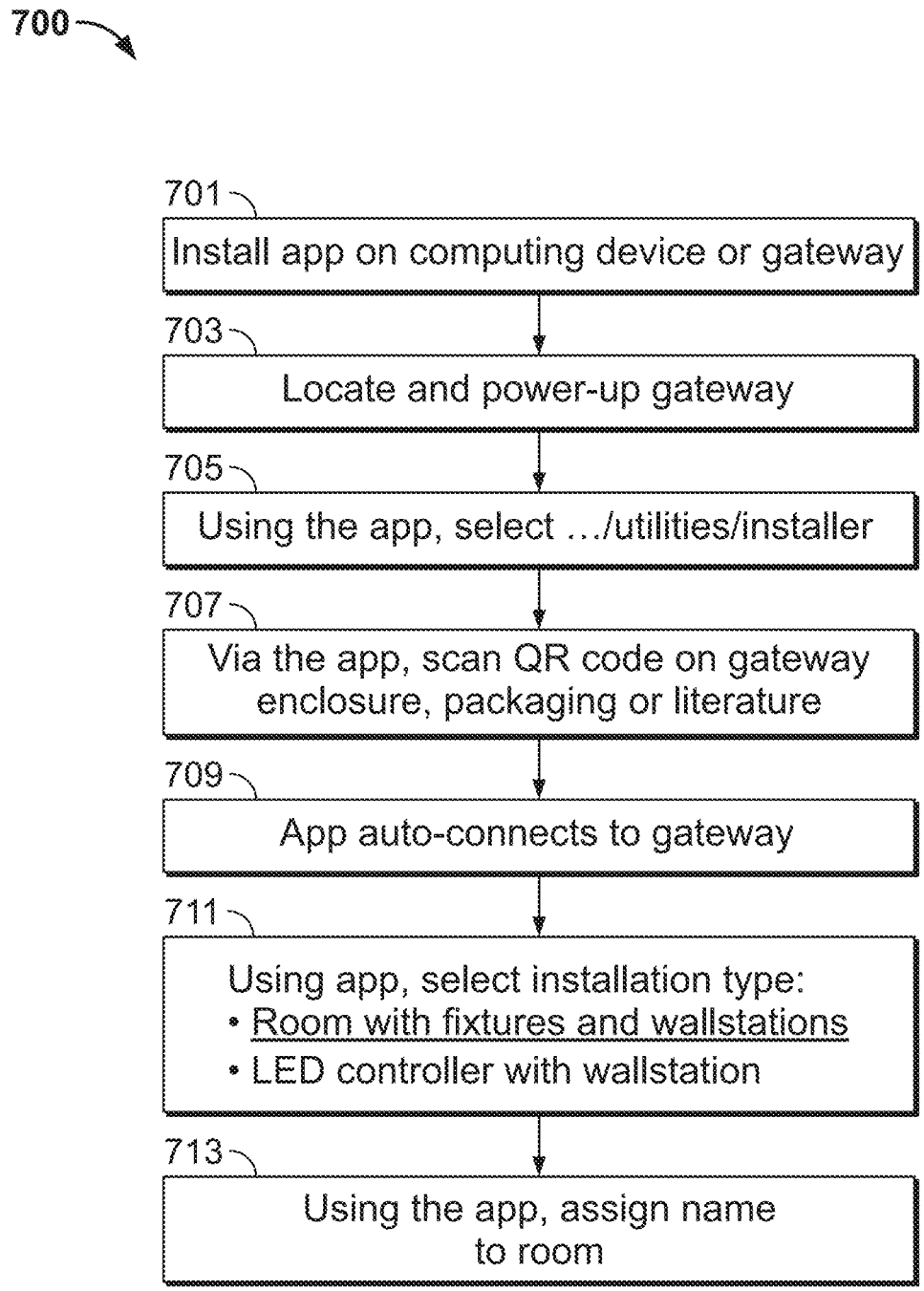
FIG. 7 shows illustrative steps of a process in accordance with the principles of the invention.

FIG. 7 shows illustrative steps of process 700. Process 700 may be performed using one or apparatus illustrated in one or more of FIGS. 1, 3, 4, 5 and 10.

Process 700 may include step 701, which may include installing an application on a mobile device, computing device or gateway. The application may be a fixture management application. The fixture management application may store room layout information such as architectural layout of room 601. The application may be downloaded from the Internet to a device such as mobile device 109. Mobile device 109 may be in on near a room include fixtures for provisioning by the application. Mobile device 109 may act as a hot spot for the gateway. Gateway 111 may be configured to perform the functions of the mobile device 109 described herein.

Process 700 may include step 703, which may include locating and powering-up gateway 111. Gateway 111 may be powered-up. Gateway 111 may be powered-up by plugging a power cord into a wall receptacle. Gateway 111 may provide communication between two or more of fixtures, companion switches and wall stations, a cloud-based server, and a user of the application. The user of the application may be a fixture installer. The user of the application may be a homeowner, contractor, or any other suitable individual. The cloud-based server may include a distributed server system.

Process 700 may include step 705, which may include using the application to select an application for downloading to mobile device 109 or gateway 111 by selecting a selectable icon such as . . . /utilities/installer. The selectable icon may be a selectable link.

Process 700 may include step 707, which may include, via the application, scanning a QR code displayed on a gateway enclosure, packaging or literature. The QR code may authenticate mobile device 109 to gateway 111. After authentication, process 700 may continue at step 709.

Process 700 may include step 709, which may include the application auto-connecting to the gateway 111. Gateway 111 may now function as an access point for one or more of the wall stations, room lights and fans on the circuit.

Process 700 may include step 711, which may include using the application, selecting an installation type. Illustrative installation types may include "room with fixtures and wall stations" and "LED controller with wall station." At step 711, installation type "room with fixtures and wall stations" may be selected.

Process 700 may include step 713, which may include using the application, assigning a name to a room. An identifier selected or input by the user into the application, such as the word "kitchen", or a prefix, such as the word "kit" may be assigned to the room. The identifier may be the circuit identifier.

Figure 8:
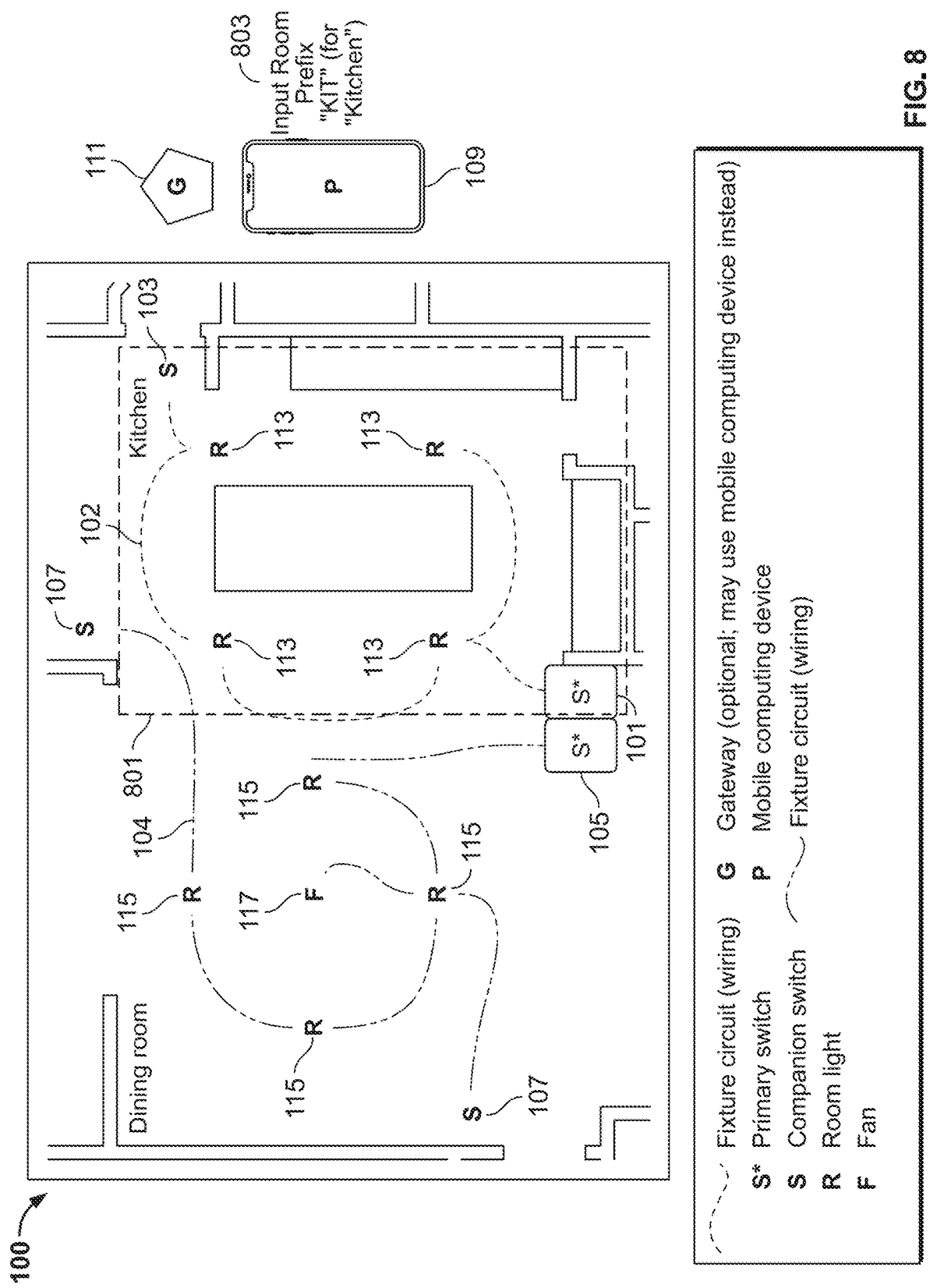
FIG. 8 shows schematically illustrative apparatus in accordance with the principles of the invention.

FIG. 8 shows illustrative architectural layout 100 and an assignment of a circuit identifier ("KIT") to a circuit included in architectural layout 100 using the application. The circuit may include one or more of wall station 101, room lights 113 and companion switch 103.

The scenario illustrated in FIG. 8 may correspond to step 713 in process 700.

Figure 9:
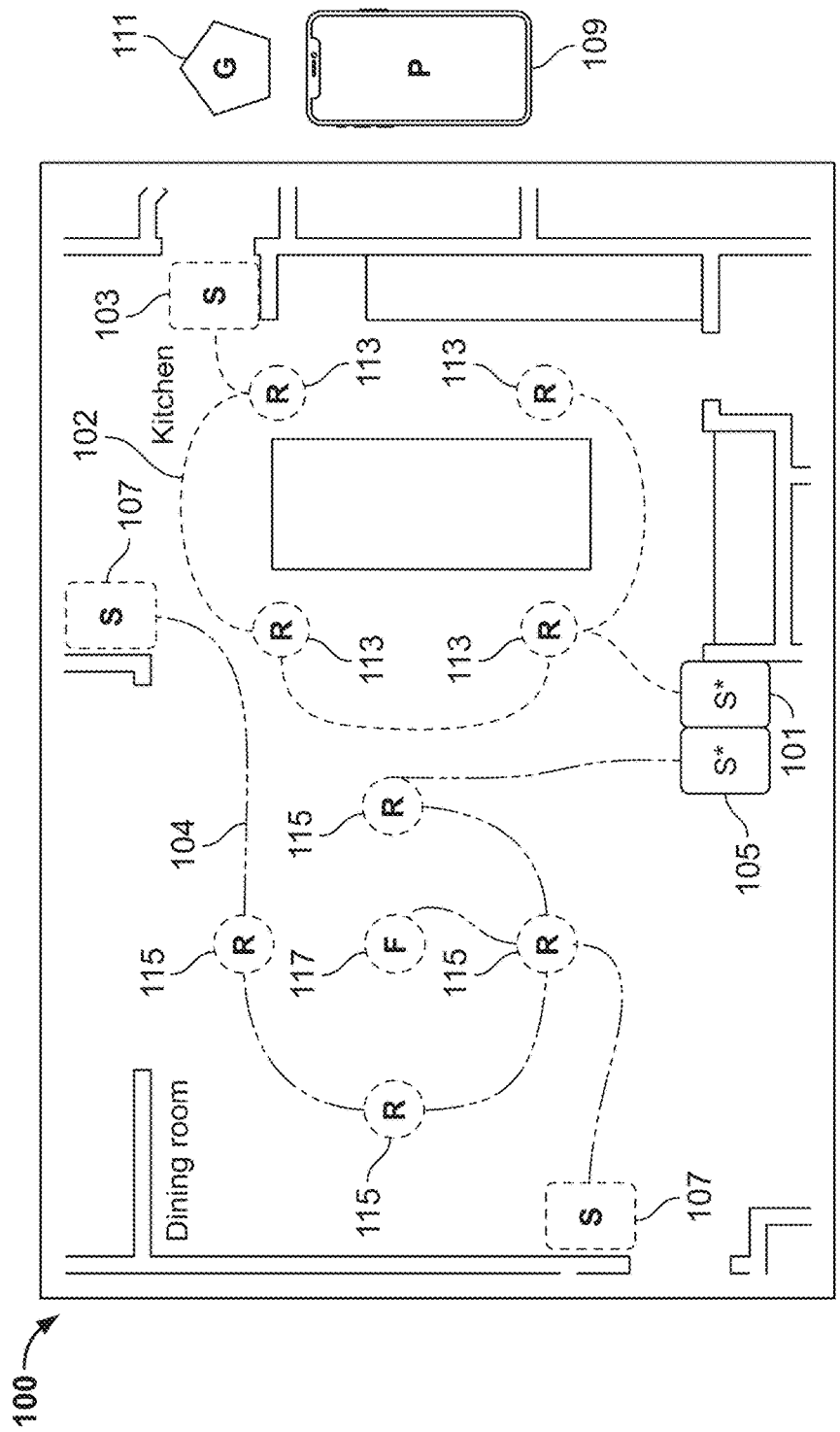
FIG. 9 shows schematically illustrative apparatus in accordance with the principles of the invention.

FIG. 9 shows illustrative architectural layout 100 when room lights 113, room lights 115 and fan 117 are not in discoverable mode. FIG. 9 illustrates that nodes in a dining room and a kitchen may initially not be in a discoverable mode in accordance with the principles of the invention.

Figure 10:
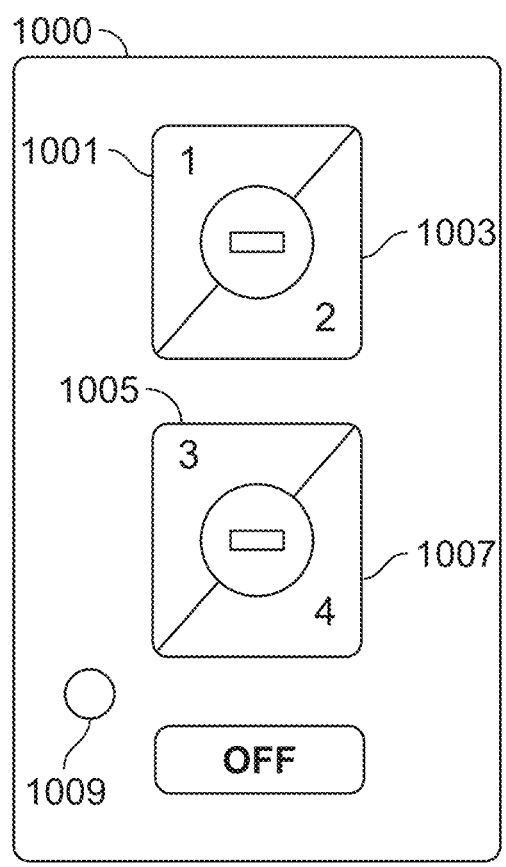
FIG. 10 shows schematically illustrative apparatus in accordance with the principles of the invention.

FIG. 10 shows schematically wall station 1000. Wall station 1000 may be used to transmit pulses over a circuit configured to propagate the pulses to the fixtures and companion switches wired to wall station 1000.

Wall station 1000 may include one or more of switches 1001, 1003, 1005 and 1007. Wall station may include indicator light 1009. A press of one or more of switches 1001, 1003, 1005 and 1007 for a period of time may instruct wall station 1000 to initiate the fixture discovery process. Indicator light 1009 may turn on to indicate when the wall station starts emitting the pulses or to acknowledge receipt of a press with a predetermined time duration.

Figure 11:
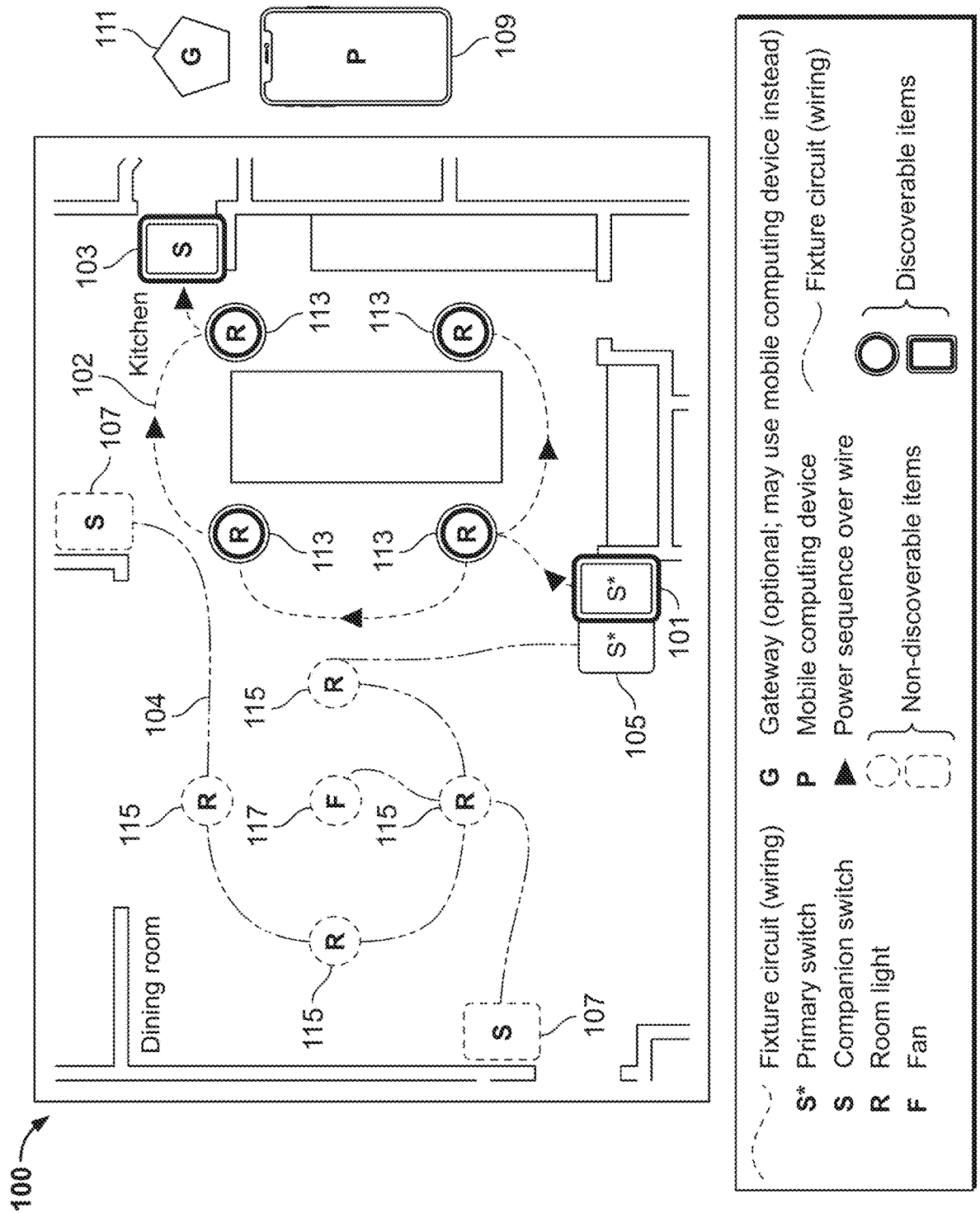
FIG. 11 shows schematically illustrative apparatus in accordance with the principles of the invention.

FIG. 11 shows, schematically, propagation of the pulses in circuit 102 included in architectural layout 100 and a corresponding change of state of the nodes included in the circuit to a discoverable mode.

Figure 12:
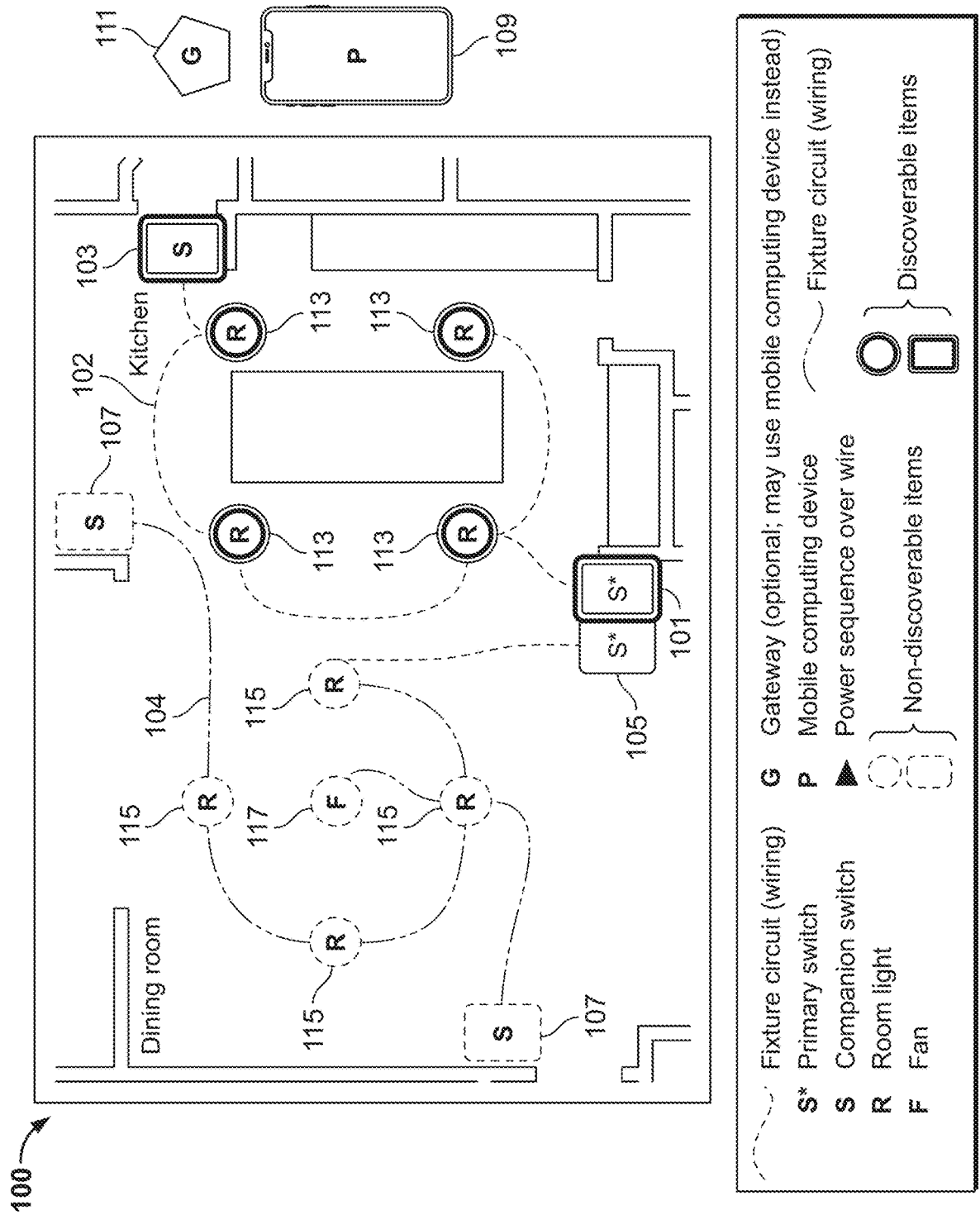
FIG. 12 shows schematically illustrative apparatus in accordance with the principles of the invention.

FIG. 12 shows, schematically, that the nodes positioned in the kitchen are in a discoverable mode. Each node in the discoverable mode may output a wireless discovery message. Each node may output a wireless discovery message using RF. Nodes positioned in the dining room are not in a discoverable mode because the dining room did not get pulsed by wall station 105.

Figure 15:
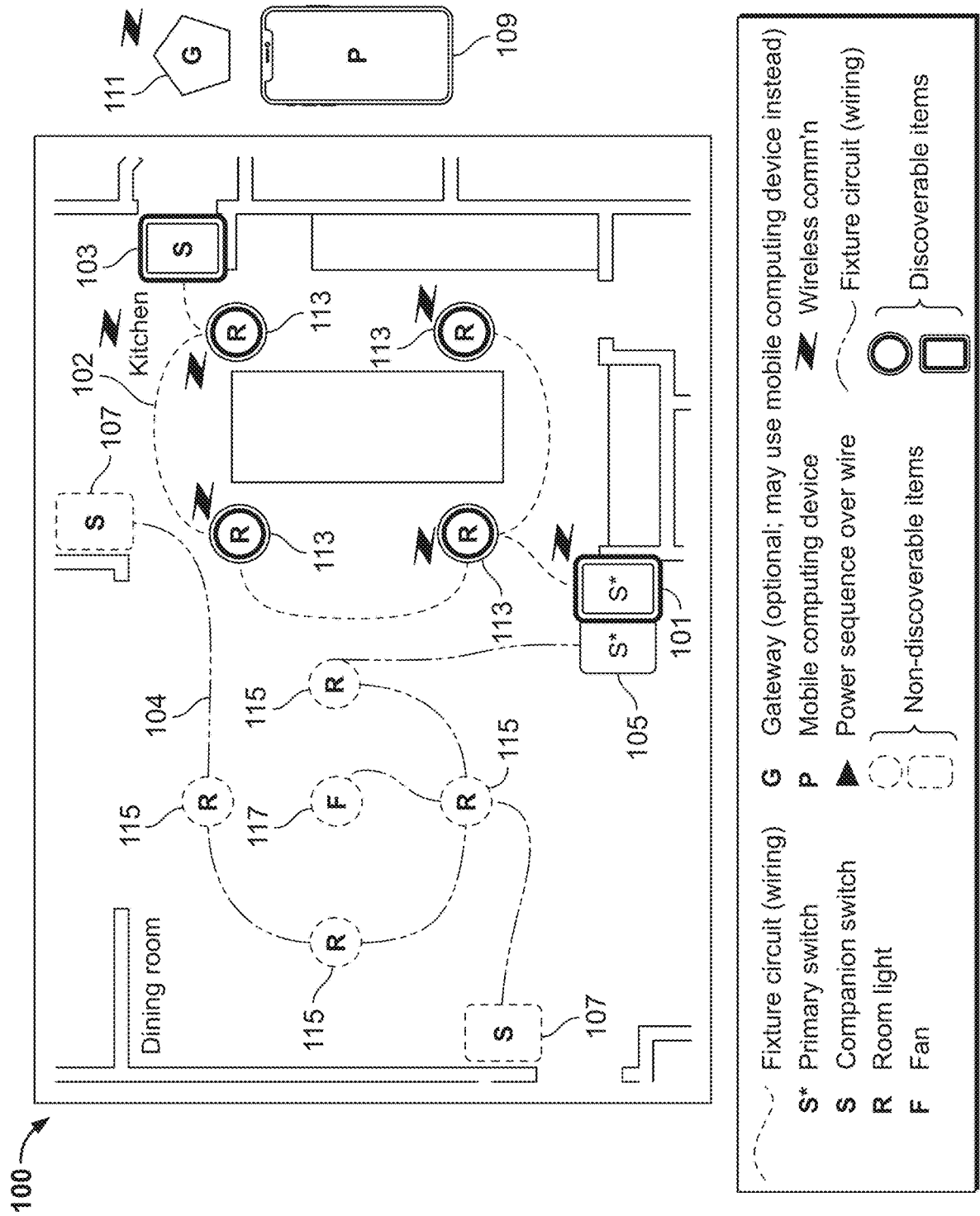
FIG. 15 shows schematically illustrative apparatus in accordance with the principles of the invention.

The scenario illustrated in FIG. 15 may correspond to step 1301 in process 1300.

Figure 13:
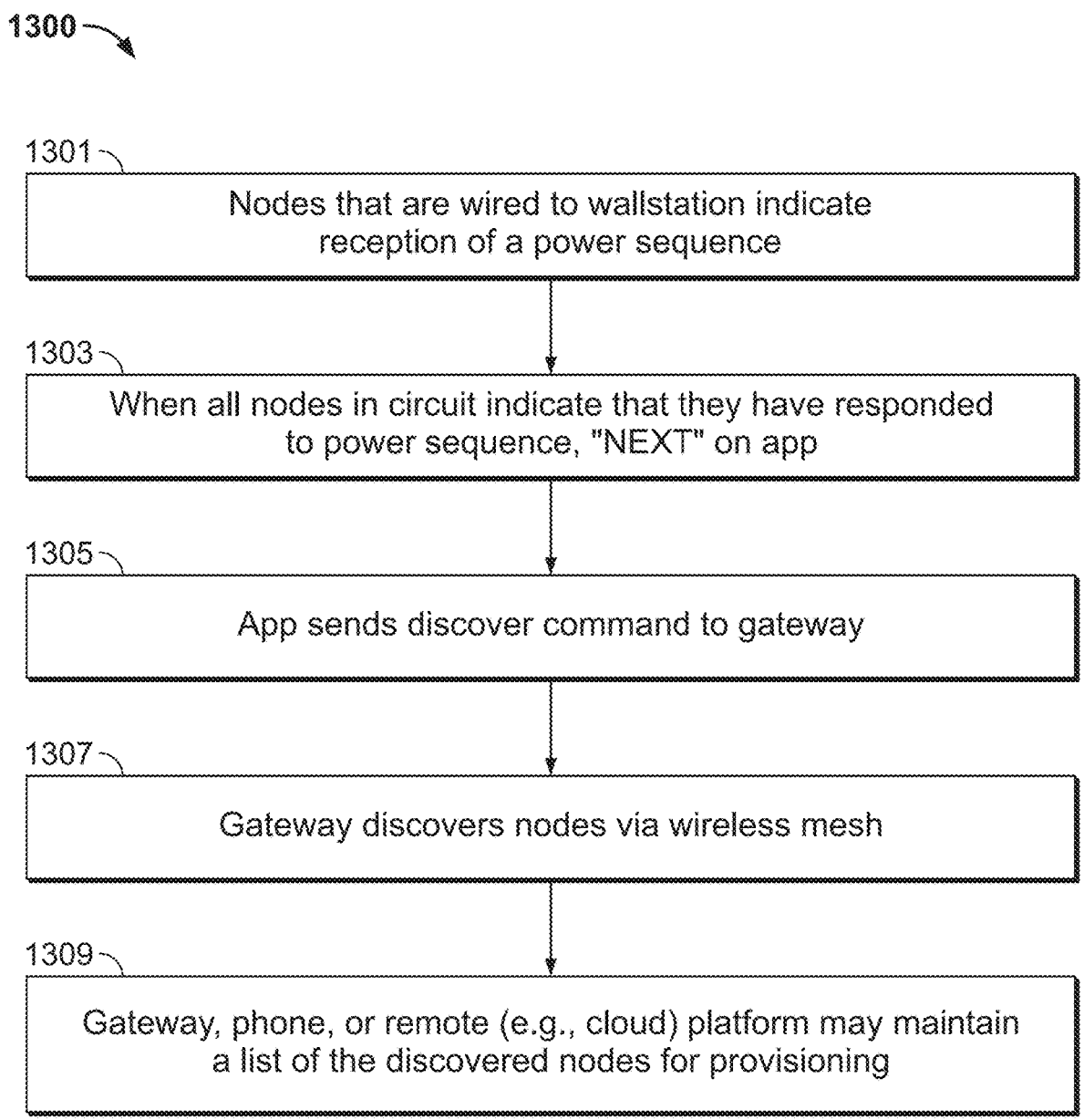
FIG. 13 shows illustrative steps of a process in accordance with the principles of the invention.

FIG. 13 shows illustrative steps of process 1300. Process 700 may be performed using one or more apparatus illustrated in one or more of FIGS. 1, 3, 4, 5 and 10.

Process 1300 may include step 1301, which may include nodes that are wired to wall station indicating reception of a power sequence. The power sequence may include the pulses. The nodes may vibrate, illuminate an indicator light, or emit a wireless signal in response to the pulses being propagated along circuit 102. Wall station 101 may illuminate an indicator light, emit a wireless signal or generate a sound to indicate that the pulses are being emitted.

Process 1300 may include step 1303, which may include, when all the nodes in the circuit indicate that they have responded to the power sequence, the selectable option 'NEXT' may be displayed by the application. The nodes may respond to the power sequence by transitioning to a discoverable mode in which they emit a wireless discovery message. The selectable option 'NEXT' may be selected by a user of the application. Process 1300 may include step 1305, which may include the application sending a discovery command to the gateway.

Process 1300 may include step 1307, which may include the gateway discovering the nodes via a wireless mesh. The gateway may receive the wireless discovery messages via the wireless mesh. Only fixtures and companion switches receiving power from wall station 101 may emit the wireless discovery messages. Fixtures and companion switches receiving power from wall station 105 may not emit wireless discovery messages because they were not pulsed by wall station 105.

Process 1300 may include step 1309, which may include gateway 111, mobile device 109, or a remote (e.g., cloud) platform maintaining a list of the discovered nodes for provisioning.

The provisioning may include a user inputting lighting scenes into the application after the nodes on circuit 102 have been discovered. Each lighting scene may be associated with a switch included on wall station 101. The provisioning may include the application associating the lighting scenes with the circuit identifier. The assigning may include storing, in a data structure, the circuit identifier, the lighting scenes and a switch associated with each lighting scene.

For example, a first lighting scene may be associated with switch 1001, a second lighting scene may be associated with switch 1003, a third lighting scene may be associated with switch 1005 and a fourth lighting scene may be associated with switch 1007. Each lighting scene may include one or more of a light level, including diming level and intensity, for one or more of red, green, blue, warm white, cool white and any other suitable color.

The provisioning may include transmitting to wall station 101 the circuit identifier, the lighting scenes and identifiers of their associated switches. The provisioning may include transmitting to wall station 101 identification information for all fixtures and companion switches that were discovered by gateway 111. The provisioning may include wall station 101 storing the received data in a memory included in wall station 101.

Wall station 101 may include the switches included in wall station 1000. After the provisioning, selection of one of switches 1001, 1003, 1005 and 1007 on wall station 101 may trigger wall station 101 to output the default power to circuit 102. Selection of the switch may also trigger wall station 101 to initiate the transmission of a wireless RF signal 101 to all the fixtures and companion switches discovered by gateway 111 during the discovery process. The wireless RF signal may include a lighting scene stored by wall station 101 and associated with the selected switch. Receipt, by room lights 113, of the lighting scene may trigger room lights 113 to output light that is defined by the lighting scene.

The provisioning may include a user selecting one or more discovered nodes to create a group. The selected nodes may be less than a total amount of nodes discovered during the discovery process. The provisioning may include the user inputting into the application, for the group, lighting scenes and identifiers of their associated switches. The provisioning may include the application associating the lighting scenes and switches with the group. The provisioning may include the application transmitting a group identifier, the lighting scenes and identifiers of their associated switches to the wall station. The provisioning may include the wall station storing the received data.

In response to a user selection at mobile device 109 to turn ON, using a lighting scene, the nodes associated with the group, the methods may include mobile device 109 transmitting a wireless instruction to wall station 101. The wireless instruction may identify the nodes in the group and the lighting scene. In response to receipt of the instruction, the wall station may provide power to the first circuit and instruct, wirelessly, the nodes included in the group to output light as detailed by the lighting scene.

Figure 14:
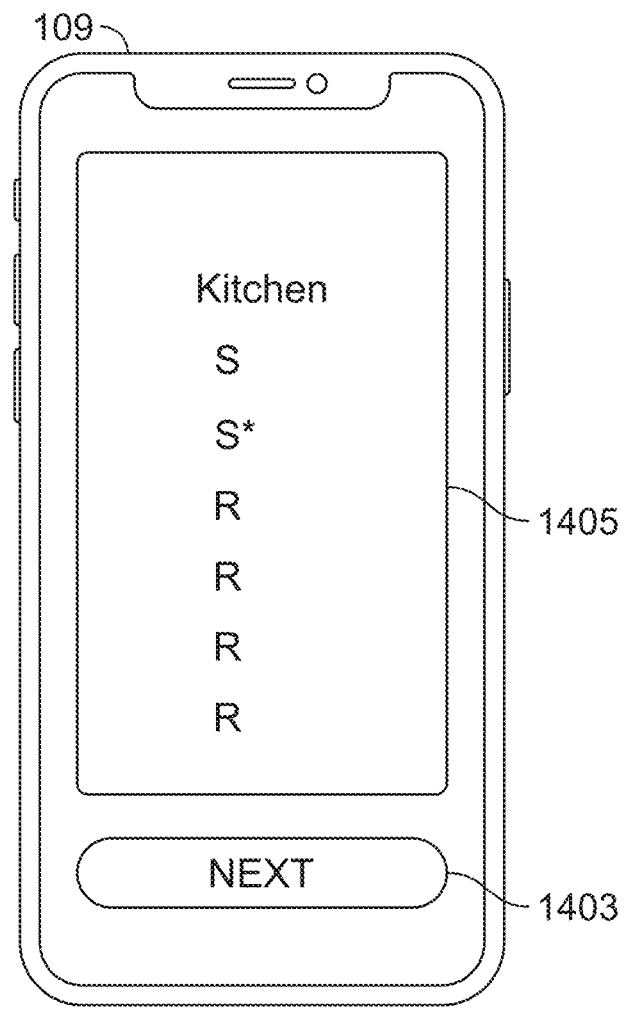
FIG. 14 shows schematically illustrative apparatus in accordance with the principles of the invention.

FIG. 14 shows illustrative mobile device 109 running the application and displaying, on a user interface of mobile device 109, list 1405 of the nodes discovered by the gateway and corresponding to the circuit labeled 'kitchen.' Phone 1401 may include a selectable icon entitled "NEXT." The selectable icon, when selected, may cause the assignment of the discovered nodes to the circuit 'kitchen' and terminate the discovery process.

The discovery process may be terminated after wall station 101 emits a final pulse. A final pulse may be defined by a zero voltage or near zero voltage period that is greater than the duration of time between the pulses. Each of the nodes may time-out after being in discoverable mode for a predetermined length of time.

The scenario illustrated in FIG. 14 may correspond to step 1601 in process 1600.

FIG. 15 shows that only kitchen nodes, in illustrative architectural layout 100, may be engaged emitting RF signals in accordance with the principles of the invention.

In FIG. 15, each kitchen node in the discoverable mode may be outputting a wireless discovery message. The wireless discovery messages may include node identification information, security credentials, or any other suitable provisioning information.

Each node may output a wireless discovery message using RF. Nodes positioned in the dining room are not in a discoverable mode because the dining room did not get pulsed by wall station 105.

The wireless discovery messages may be received by gateway 111. The wireless discovery messages may be received by mobile device 109.

The scenario illustrated in FIG. 15 may correspond to step 1301 in process 1300.

FIG. 16 shows illustrative steps of process 1600. Process 700 may be performed using one or more apparatus illustrated in one or more of FIGS. 1, 3, 4, 5 and 10.

Process 1600 may include step 1601, which may include the application displaying a list of pending fixtures. The list of pending fixtures may be the fixtures discovered during the discovery process. When a user determines that all the fixtures in the circuit are displayed, the user may select 'NEXT.' The selection may be a confirmation, by the user, that the pending fixtures are to be associated with a circuit identifier. The circuit identifier may have been assigned to the circuit as illustrated in FIG. 7 step 713 and FIG. 8 step 803 and as described herein.

Process 1600 may include step 1603, which may include the gateway provisioning devices to the mesh. The provisioning may include associating the fixtures with the circuit identifier. The circuit identifier may include a group. The gateway may name fixtures using the circuit identifier. The gateway may assign a group, such as a room or a subset of room nodes, to one or more wall stations.

Process 1600 may include step 1605, which may include the nodes being configured to be contacted wirelessly via a wall station that includes wall station 101. Process 1600 may include step 1607, which may include the gateway being powered off.

Processes 700, 1300 and 1600 may be practiced sequentially. Processes 700, 1300 and 1600 have been illustrated separately for the sake of simplicity.

Figure 17:
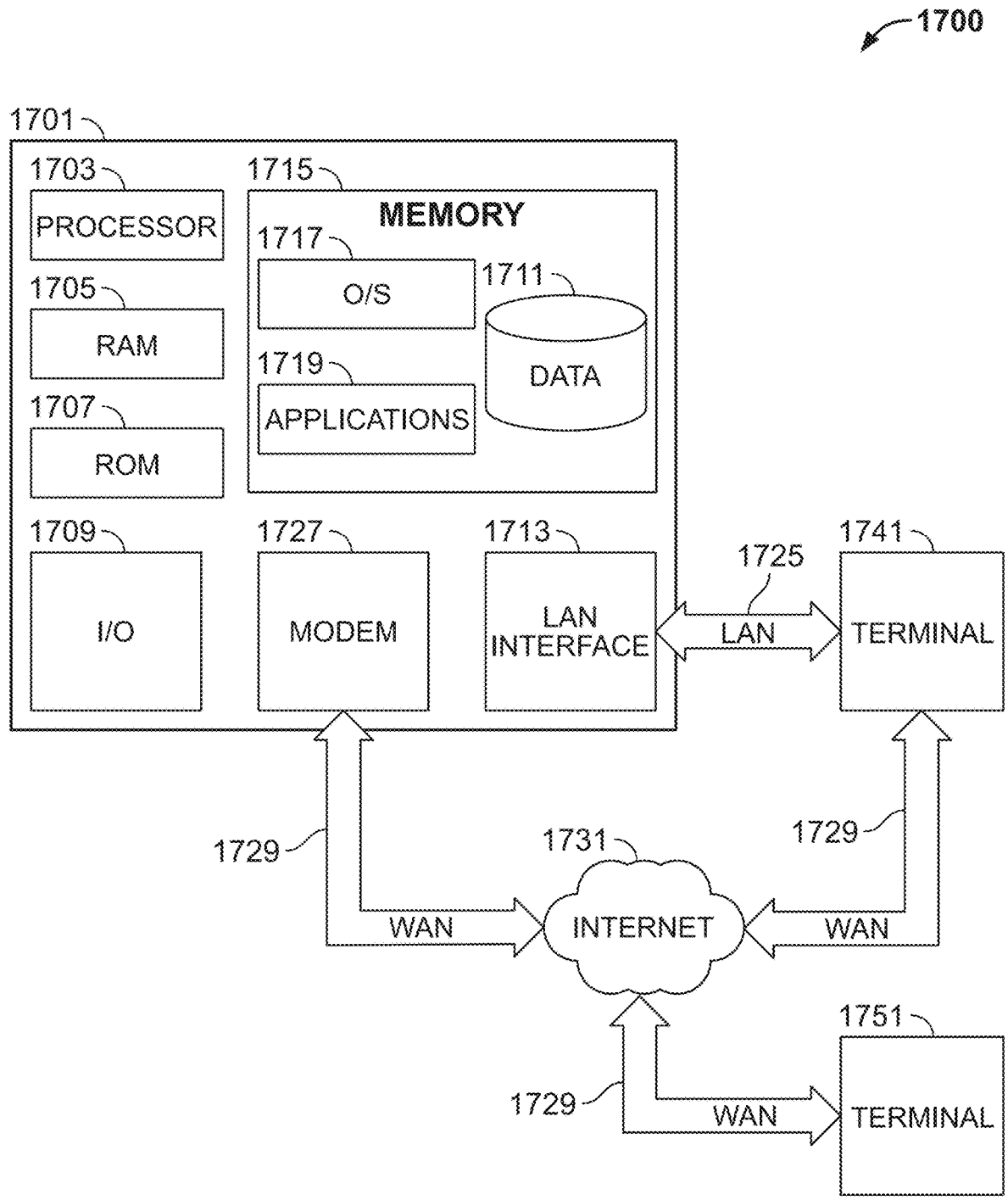
FIG. 17 shows schematically illustrative apparatus in accordance with the principles of the invention.

FIG. 17 shows an illustrative block diagram of system 1700 that includes computer 1701. Computer 1701 may alternatively be referred to herein as an "engine," "server" or a "computing device." The computing system may include one or more computer servers.

Computer 1701 may be any computing device described herein, such the phone, the fixture, the switch, the gateway and the wall station. Elements of system 1700, including computer 1701, may be used to implement various aspects of the systems and methods disclosed herein. The wall station, the companion switch, the gateway, the mobile device, the microprocessor, the wireless communication device, the radio frequency interface, and the fixtures may have one or more features in common with computer 1701. Wall station 101, companion switch 103, wall station 105, companion switches 107, room lights 113, room lights 115, fan 117, gateway 111 and mobile device 109 may have one or more features shown and discussed in connection with computer 1701.

Computer 1701 may have a processor 1703 for controlling the operation of the device and its associated components, and may include RAM 1705, ROM 1707, input/output circuit 1709, and a non-transitory or non-volatile memory 1715. Machine-readable memory may be configured to store information in machine-readable data structures. Machine-readable memory may store circuit identifiers and nodes associated with the circuit identifiers, and one or more lighting scenes for each circuit identifier. Other components commonly used for computers, such as EEPROM or Flash memory or any other suitable components, may also be part of the computer 1701.

Memory 1715 may be comprised of any suitable permanent storage technology—e.g., a hard drive. Memory 1715 may store software including the operating system 1717 and application(s) 1719 along with any data 1711 needed for the operation of computer 1701. Memory 1715 may also store videos, text, and/or audio assistance files. The data stored in Memory 1715 may also be stored in cache memory, or any other suitable memory.

Input/output ("I/O") module 1709 may include connectivity to a microphone, keyboard, touch screen, mouse, and/or stylus through which input may be provided into computer 1701. The input may include input relating to cursor movement. The input/output module may also include one or more speakers for providing audio output and a video display device for providing textual, audio, audio-visual, and/or graphical output. The input and output may be related to computer application functionality.

Computer 1701 may be connected to other systems via a local area network (LAN) interface 1713. Computer 1701 may operate in a networked environment supporting connections to one or more remote computers, such as terminals 1741 and 1751. Terminals 1741 and 1751 may be personal computers or servers that include many or all of the elements described above relative to computer 1701.

When used in a LAN networking environment, computer 1701 is connected to LAN 1725 through a LAN interface 1713 or an adapter. When used in a WAN networking environment, computer 1701 may include a modem 1727 or other means for establishing communications over WAN 1729, such as Internet 1731.

In some embodiments, computer 1701 may be connected to one or more other systems via a short-range communication network (not shown). In these embodiments, computer 1701 may communicate with one or more other terminals 1741 and 1751, using a personal area network such as Bluetooth®, NFC, ZigBee, a Bluetooth® mesh network or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server, such as the remote emulator, may transmit data to any other suitable computer system. The web-based server may also send computer-readable instructions, together with the data, to any suitable computer system or device, such as the central server. The computer-readable instructions may be to store the data in cache memory, the hard drive, secondary memory, or any other suitable memory.

Additionally, application program(s) 1719, which may be used by computer 1701, may include computer executable instructions for invoking functionality related to communication, such as e-mail, Short Message Service (SMS), and voice input and speech recognition applications. Application program(s) 1719 (which may be alternatively referred to herein as "plugins," "applications," or "apps") may include computer executable instructions for invoking functionality related to performing various tasks. Application programs 1719 may utilize one or more algorithms that process received executable instructions, perform power management routines or other suitable tasks. Application programs 1719 may include any one or more of the applications, instructions and algorithms associated with functions performed by the POS device and the central server, as described herein.

Application program(s) 1719 may include computer executable instructions (alternatively referred to as "programs"). The computer executable instructions may be embodied in hardware or firmware (not shown). Computer 1701 may execute the instructions embodied by the application program(s) 1719 to perform various functions.

Application program(s) 1719 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 1719 may include one or more algorithms that may be used to implement features of the disclosure.

The invention may be described in the context of computer-executable instructions, such as applications 1719, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices.

Computer 1701 and/or terminals 1741 and 1751 may also include various other components, such as a battery, speaker, and/or antennas (not shown). Components of computer system 1701 may be linked by a system bus, wirelessly or by other suitable interconnections. Components of computer system 1701 may be present on one or more circuit boards. In some embodiments, the components may be integrated into a single chip. The chip may be silicon-based.

Terminal 1751 and/or terminal 1741 may be portable devices such as a laptop, cell phone, Blackberry™, tablet, smartphone, or any other computing system for receiving, storing, transmitting and/or displaying relevant information. Terminal 1751 and/or terminal 1741 may be one or more user devices. Terminals 1751 and 1741 may be identical to computer 1701 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 18:
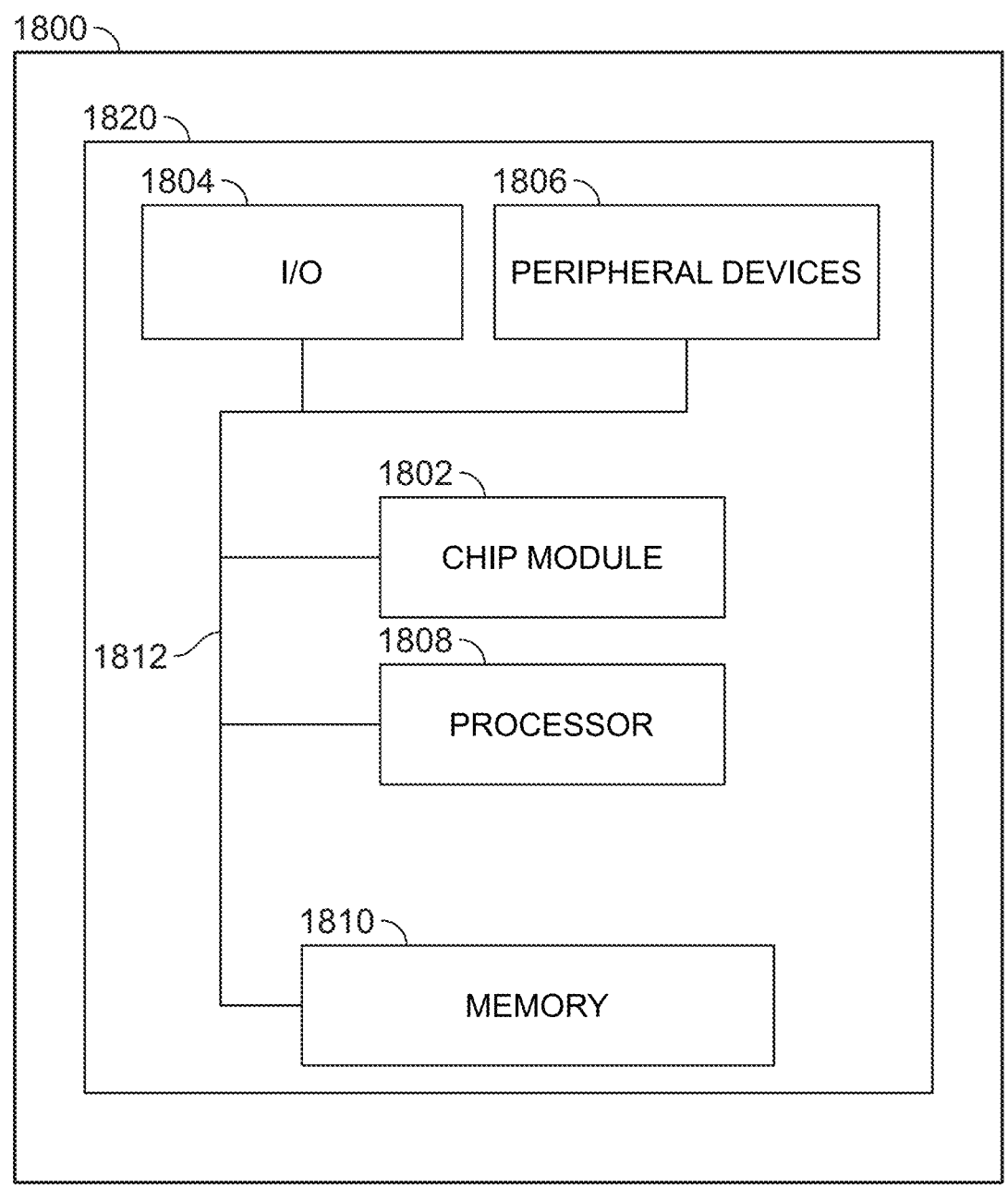
FIG. 18 shows schematically illustrative apparatus in accordance with the principles of the invention.

FIG. 18 shows illustrative apparatus 1800 that may be configured in accordance with the principles of the disclosure. Apparatus 1800 may be a computing device such as computer 1701. Computer 1701 may include some or all of the components of apparatus 1800.

Apparatus 1800 may include chip module 1802, which may include one or more integrated circuits, and which may include logic configured to perform any other suitable logical operations.

Apparatus 1800 may include one or more of the following components: I/O circuitry 1804, which may include a transmitter device and a receiver device and may interface with fiber optic cable, coaxial cable, telephone lines, wireless devices, PHY layer hardware, a keypad/display control device or any other suitable media or devices; peripheral devices 1806, which may include counter timers, real-time timers, power-on reset generators or any other suitable peripheral devices; logical processing device 1808, which may compute data structural information and structural parameters of the data; and machine-readable memory 1810.

Machine-readable memory 1810 may be configured to store in machine-readable data structures: machine executable instructions, (which may be alternatively referred to herein as "computer instructions" or "computer code"), applications, signals, and/or any other suitable information or data structures.

Components 1802, 1804, 1806, 1808 and 1810 may be coupled together by a system bus or other interconnections 1812 and may be present on one or more circuit boards such as circuit board 1820. In some embodiments, the components may be integrated into a single chip. The chip may be silicon-based.

Thus, apparatus and methods for IoT devices have been provided. Persons skilled in the art will appreciate that the present invention may be practiced by other than the described embodiments, which are presented for purposes of illustration rather than of limitation.

What is claimed is:

1. A method for provisioning IoT fixtures, the method comprising:
   inputting to a microprocessor a circuit identifier associated with a circuit that includes a first fixture that is within a reception range of a radio frequency fixture interface, a second fixture being deployed within the reception range;
   initiating a fixture discovery process, over a wired path, from a wall station that is:
     in wired communication with the first fixture; and
     not in wired communication with the second fixture;
   receiving, at a wireless communication device, a wireless discovery message from the first fixture and not from the second fixture; and
   in response to receipt of the wireless discovery message, confirming an association between the first fixture with the circuit identifier.

2. The method of claim 1 wherein the initiating includes outputting, from the wall station, over the wired path, a series of voltage pulses.

3. The method of claim 2 wherein the initiating includes providing, to the wall station, from the wireless communication device, an instruction to output the voltage pulses.

4. The method of claim 2 wherein the initiating includes operating a switch at the wall station to cause the wall station to output the voltage pulses.

5. The method of claim 4 wherein the switch is one of a plurality of switches that are co-operable to cause the wall station to output the voltage pulses.

6. The method of claim 2 wherein the voltage pulses are configured to increment a counter in the first fixture and cause the first fixture to transmit the wireless discovery message when the counter reaches a pre-set value.

7. The method of claim 1 wherein, during the fixture discovery process, the first fixture is configured to continuously transmit the wireless discovery message.

8. The method of claim 1 wherein, during the fixture discovery process, the first fixture is configured to repeatedly transmit the wireless discovery message.

9. The method of claim 1 further comprising receiving, at the wireless communication device, a second wireless discovery message from the first fixture, the second wireless discovery message corresponding to a third fixture included in the circuit.

10. The method of claim 9 wherein the third fixture is not in the reception range.

11. The method of claim 1 wherein the wireless discovery message includes first fixture identification information.

12. The method of claim 1 wherein the wireless communication device includes the microprocessor.

13. The method of claim 1 further comprising, when the wireless discovery message is a first wireless discovery message, receiving, at the wireless communication device, a second wireless discovery message from the wall station.

14. The method of claim 13 further comprising associating the wall station with the circuit identifier.

15. The method of claim 14 further comprising transmitting to the wall station, from the wireless communication device, first fixture identification information included in the wireless discovery message.

16. The method of claim 13 further comprising receiving, at the wireless communication device, a third wireless discovery message from a companion switch associated with the circuit.

17. The method of claim 16 further comprising associating the wall station and the companion switch with the circuit identifier.

18. The method of claim 16 further comprising transmitting, from the wireless communication device to the wall station and the companion switch, first fixture identification information included in the wireless discovery message.

19. The method of claim 1 further comprising, when the first fixture is one of a plurality of first fixtures associated with the circuit, receiving at the wireless communication device a plurality of wireless discovery messages, each of the plurality of wireless discovery messages corresponding to one of the plurality of first fixtures.

20. The method of claim 19 further comprising associating the plurality of first fixtures, and not the second fixture, with the circuit identifier.

21. The method of claim 1 further comprising, after completion of the fixture discovery process, transmitting a lighting instruction to the first fixture using wireless signals only.

22. The method of claim 1 wherein:
   the wall station includes a mechanical switch; and prior to the initiating of the fixture discovery process, the wall station is configured to provide a default amount of power to the first fixture, over the circuit, when a user operates the mechanical switch.

23. The method of claim 22 wherein the default amount of power is 100% of a maximum power at a correlated color temperature of 3000K.

24. The method of claim 1 further comprising:
when the fixture discovery process is a first fixture discovery process,
initiating a second fixture discovery process over a wired path from a second wall station that is:
in wired communication with the second fixture; and
not in wired communication with the first fixture;
receiving, at the wireless communication device, a second wireless discovery message from the second fixture and not from the first fixture; and
in response to receipt of the second wireless discovery message, associating the second fixture, and not the first fixture, with second circuit identifier.

25. The method of claim 24 wherein the wireless communication device is configured to, prior to the initiating of the second fixture discovery process, determine whether the first fixture discovery process is running.

26. The method of claim 25 wherein the wireless communication device is configured to, in response to a determination that the first fixture discovery process is running, decline to initiate the second fixture discovery process.

27. The method of claim 1 further comprising transmitting, from the wireless communication device, a first lighting scene and a second lighting scene to the wall station, the first lighting scene associated with a first switch of the wall station and the second lighting scene associated with a second switch of the wall station.

28. The method of claim 27 further comprising transmitting from the wireless communication device to the wall station an instruction to implement the first lighting scene on the first fixture.

* * * * *